(12) United States Patent
Threlkeld et al.

(10) Patent No.: US 9,390,185 B2
(45) Date of Patent: Jul. 12, 2016

(54) COMMAND LINES

(71) Applicant: 1E Limited, London (GB)

(72) Inventors: Richard Threlkeld, Boca Raton, FL (US); Ripal Vaidya, London (GB); Osama Al-Hassani, London (GB)

(73) Assignee: 1E Limited, New York, NY (US)

( * ) Notice: Subject to any disclaimer, the term of this patent is extended or adjusted under 35 U.S.C. 154(b) by 73 days.

(21) Appl. No.: 14/265,307

(22) Filed: Apr. 29, 2014

(65) Prior Publication Data

US 2015/0309781 A1    Oct. 29, 2015

(51) Int. Cl.
*G06F 9/445* (2006.01)
*G06F 17/30* (2006.01)
*H04L 29/08* (2006.01)
*G06F 9/44* (2006.01)

(52) U.S. Cl.
CPC ............ *G06F 17/30876* (2013.01); *G06F 8/61* (2013.01); *G06F 8/65* (2013.01); *G06F 8/70* (2013.01); *G06F 17/30864* (2013.01); *H04L 67/10* (2013.01)

(58) Field of Classification Search
CPC ................................................ G06F 8/60–8/78
See application file for complete search history.

(56) References Cited

U.S. PATENT DOCUMENTS

| | | | |
|---|---|---|---|
| 8,914,783 B2 * | 12/2014 | Van Camp | G06F 8/65 717/168 |
| 2003/0074356 A1 | 4/2003 | Kaler | |
| 2007/0143379 A1 * | 6/2007 | i Dalfo | G06F 8/61 |
| 2007/0288990 A1 | 12/2007 | Seiler | |
| 2008/0134175 A1 * | 6/2008 | Fitzgerald | G06F 9/45533 718/1 |
| 2009/0138573 A1 | 5/2009 | Campbell | |
| 2009/0183150 A1 * | 7/2009 | Felts | G06F 8/60 717/173 |
| 2009/0187413 A1 | 7/2009 | Abels | |
| 2009/0187929 A1 | 7/2009 | Kushwaha | |
| 2009/0216865 A1 * | 8/2009 | Sakai | G06F 3/1203 709/221 |
| 2010/0058313 A1 * | 3/2010 | Hansmann | G06F 8/68 717/168 |
| 2010/0100966 A1 | 4/2010 | Hamid | |
| 2010/0131473 A1 | 5/2010 | Bjork | |

(Continued)

FOREIGN PATENT DOCUMENTS

| | | |
|---|---|---|
| CN | 102332070 A | 1/2012 |
| JP | 2013109553 A | 6/2013 |

OTHER PUBLICATIONS

Kecskemeti, Gabor, et al., "Automatic Service Deployment Using Virtualisation", 2008, pp. 628-635.*

(Continued)

*Primary Examiner* — Thuy Dao
*Assistant Examiner* — Christopher Franco
(74) *Attorney, Agent, or Firm* — EIP US LLP

(57) ABSTRACT

Software is installed and/or un-installed in networks. Each of a plurality of networks has a network management system storing metadata comprising at least the identities and command lines of software installed using installation systems of the management systems. On each network the network management system of the network is accessed to obtaining the metadata of items of software run on the network. That metadata is sent to a server which serves all the networks. At the server, a comparison is done to compare the metadata of instances of the same software on different networks. For those instances of the same software having the same metadata on different networks, the metadata is storing in a database. The networks use the metadata stored in the database to automatically install or un-install software.

6 Claims, 4 Drawing Sheets

(56) References Cited

U.S. PATENT DOCUMENTS

| | | | | |
|---|---|---|---|---|
| 2010/0229014 A1* | 9/2010 | Blackburn | ............ | G06F 1/3203 713/323 |
| 2010/0299419 A1 | 11/2010 | Ramankutty | | |
| 2012/0239798 A1* | 9/2012 | Cudd | ........................ | G06F 8/61 709/224 |
| 2014/0137097 A1* | 5/2014 | Sakai | ........................ | G06F 8/65 717/172 |
| 2014/0223416 A1* | 8/2014 | Cohen | ........................ | G06F 8/73 717/123 |

OTHER PUBLICATIONS

Rodriguez-Martinez, Manuel, et al., "Automatic Deployment of Application-Specific Metadata and Code in MOCHA", 2000, pp. 69-85.*

Poole, John D., "Model-Driven Architecture: Vision, Standards and Emerging Technologies", 2001, pp. 1-15.*

Kecskemeti, G., et al., "Virtual Deployment Appliances—A Way to Provide Automatic Service Deployment", 2010, pp. 67-77.*

Fischer, Jeffrey, et al., "Engage: A Deployment Management System", 2012, pp. 263-273.* van der Burg, Sander, et al., "Software Deployment in a Dynamic Cloud: From Device to Service Orientation in a Hospital Environment", 2009, pp. 61-66.*

Australian Signals Directorate: "Strategies to Mitigate Targeted Cyber Intrusions" Feb. 2014 Top 35 mitigation strategies http://www.asd.gov.au/infosec/top35mitigationstrategies.htm.

InfoSec Handlers Diary Blog: "Cyber Security Awareness Month—Day 30—DSD 35 mitigating controls"; by Mark Hoffman Oct. 30, 2012 http://isc.sans.edu/diary/Cyber+Security+Awareness+Month+-+Day+30+-+DSD+35+mitigating+controls/14419.

Communications Security Establishment Canada; "Minimizing Administrative Privileges Explained—Guidance for the Government of Canada" Jan. 2013 http://www.cse-cst.gc.ca/its-sti/publications/itsb-bsti/itsb94-eng.html.

Australian Signals Directorate: "Minimizing Administrative Privileges Explained" Dec. 2012 http://www.asd.gov.au/publications/csocprotect/minimising_admin_privileges.htm.

Australian Government, Department of Defense Intelligence and Security: "Minimizing Administrative Privileges Explained" Jun. 2011 http://citadel-information.com/wp-content/uploads/2012/08/minimising-administrative-privileges-australian-defense-2011.pdf.

AppSense User Rights Management: "Practical and cost effective balance between IT compliance and user demand" Oct. 17, 2012 http://www.appsense.com/media/9574180/urm_overview_us.pdf.

\* cited by examiner

COMMAND LINES

BACKGROUND OF THE INVENTION

1. Field of the Invention

The present application relates to installing and/or un-installing software on networks and to methods and computer programs for use in installing and/or un-installing software on networks.

2. Description of the Related Technology

A network of computers may have tens, or even hundreds or more, of computers and each computer may have a large number of programs installed on it. To install or uninstall software on a large network can be a difficult task. It is advantageous to install software which is up to date on a network to maintain the security of the network. There is a need to provide software tools for facilitating the installation (or un-installation) of software on networks.

SUMMARY

According to one embodiment of the invention, there is provided a computer implemented method of installing and/or un-installing software in a network, the method comprising, on each of a plurality of networks, accessing a network management system of the network, the network management system storing metadata comprising at least the identities and command lines of software installed using installation systems of the management systems, and obtaining the metadata for items of software run on the network; comparing the metadata of instances of the same software on different networks; and for those instances of the same software having the same metadata on different networks, storing in a database the metadata of the instances of the software; and using the metadata stored in the database to automatically install or un-install software in at least one of the networks.

An example of the present invention automatically installs and/or un-installs software in networks. Each of a plurality of networks has a network management system storing metadata comprising at least the identities and command lines of software installed using installation systems of the management systems. On each network the network management system of the network is accessed to obtaining the metadata of items of software run on the network. That metadata is sent to a server which serves all the networks. At the server, a comparison is done to compare the metadata of instances of the same software on different networks. For those instances of the same software having the same metadata on different networks, the metadata is storing in a database. The networks use the metadata stored in the database to automatically install or un-install software.

According to another embodiment of the invention, there is provided a method of processing software in a network having a network management system having a data base storing an application execution history table and an application package table which stores metadata comprising at least the identities and command lines of software installed on the network, the method comprising running on a computer of the network a program configured to access the network management system of the network, and identifying the metadata for an item of software run on the network by comparing fields of the application execution history table with fields of the application package table, and sending the identified metadata to another computer.

Further features and advantages of the invention will become apparent from the following description of illustrative embodiments of the invention, given by way of example only, which is made with reference to the accompanying drawings.

DETAILED DESCRIPTION OF CERTAIN INVENTIVE EMBODIMENTS

Figure 1:
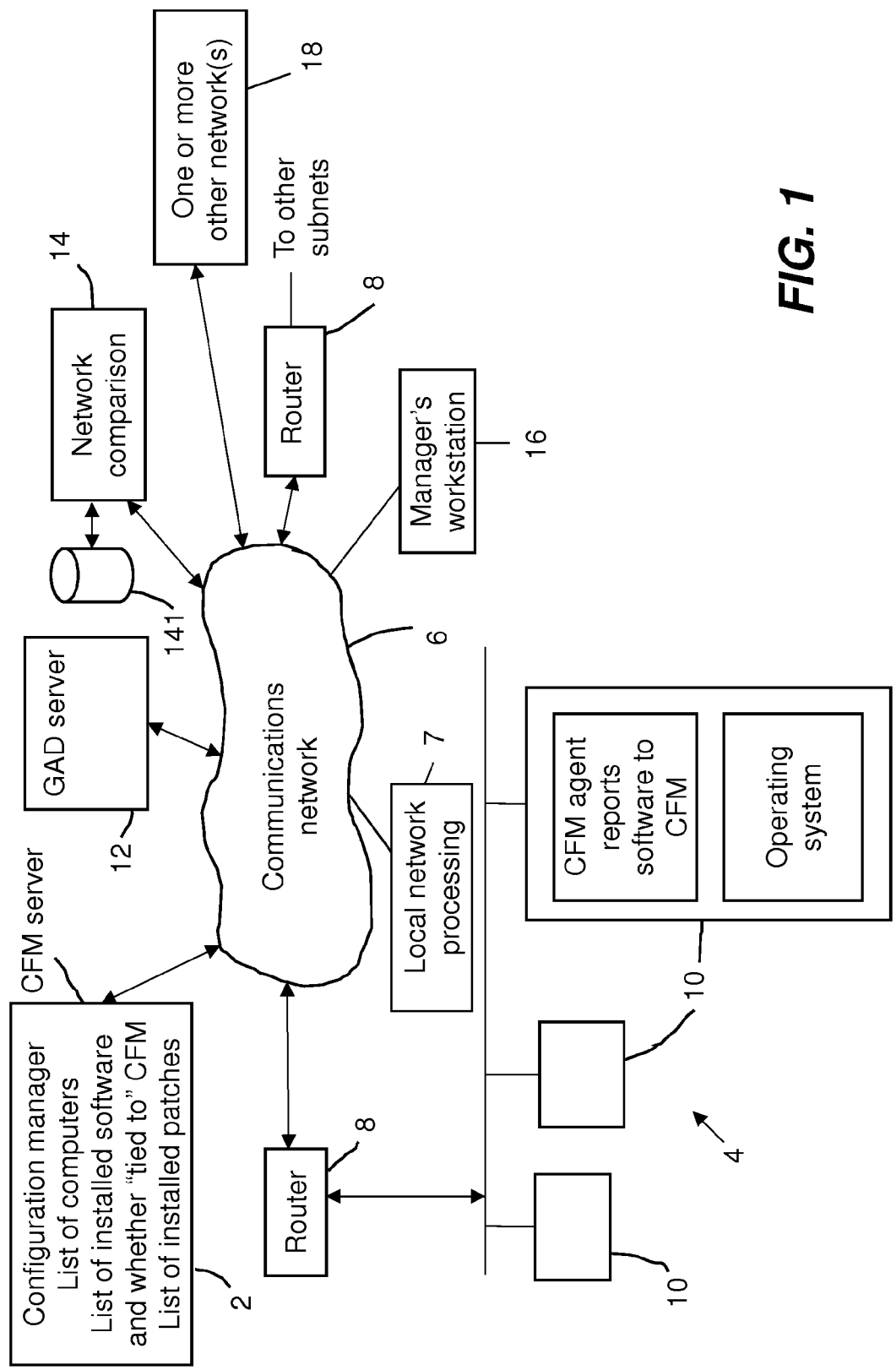
FIG. 1 is a schematic diagram of a physical computer network.

FIG. 1 illustrates an example of a network in which the present invention may be used, but those skilled in the art will appreciate the invention may be used in other networks.

The network of FIG. 1 comprises a network management system, in this example a Microsoft Configuration Manager (CFM) 2 coupled to one or more sub-networks or network branches 4 by a communications network 6 via one or more routers 8. CFM 2 has a database 21. Each sub-network 4 comprises one or more computers 10. Other examples of network management systems are available from other companies. The computers 10 may be of different types for example desk top computers, laptops amongst others. Portable computers such as laptops may be connected to the network only temporarily.

Each computer 10 has at least an operating system, applications software and a CFM agent. Administrator rights are set in the operating system. The CFM agent communicates with the CFM 2 informing the CFM 2 in known manner of software installed on the computer. Software may be installed on a computer 10 using an installer of the network management system, for example using Microsoft Installer. Software may also be installed on a computer 10 by the user if the user has administrator rights which allow that. The Configuration Manager CFM 2 stores data relating to the computers 10 and the software installed on them including data identifying the computers, data identifying the software, including patches, installed on them, and other data as will be described in more detail below. One or more manager's workstations 16 may be in the network.

The network of FIG. 1 also includes a computer, e.g. a server, 12 on which is a Global Active Directory (GAD) and a computer 7, for example a server which carries out local processing of CFM data as will be described with reference to FIG. 3. Computer 7 is referred to herein as a local processor.

The network of FIG. 1 is connected via the communications network 6 to a computer 14, for example a server, referred herein as a third party computer because it may be operated by an organization independent of the owners of the domain of FIG. 1. The computer 14 has a database 141. The network of FIG. 1 is in a domain. The server 14 may be outside the domain. In this example, the communications network 6 is connected to one or more other networks 18 which are in domains and the third party computer 14 communicates with the other networks 18 but be outside the domains of the other networks. The computer 14 carries out other processing of data of plural networks as will be described with reference to FIG. 3.

Figure 2:
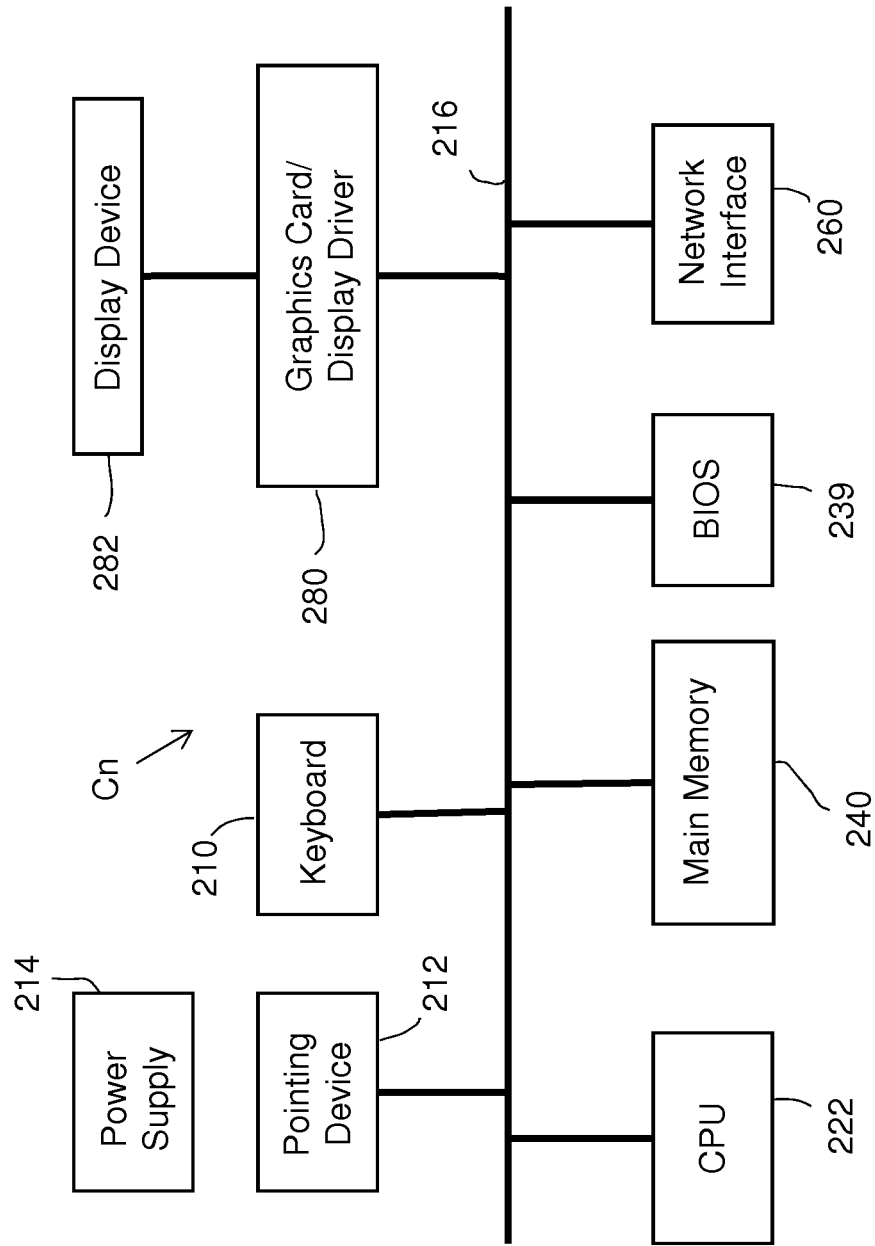
FIG. 2 is a schematic diagram of a computer of the network of FIG. 1.

Referring to FIG. 2, an illustrative one of the computers 2, 7, 10, 12, 14 and 16 comprises, amongst other items: a CPU 222; a main memory 240 for example a hard disk drive or other storage device, for example electronic memory; a network interface 260, a BIOS 239 and one or more busses 216. The BIOS 239 is typically a Read Only Memory (ROM). The computers may also have other items for example a display driver 280 coupled to a display device 282; human interface devices or input devices for example a keyboard 210 and a pointing device 212. The items are conventional and interact via the bus(es) 216 in a conventional way. The network interface couples the computer to the communications network 6 via the routers 10 and to other computers in the sub-network 4 having respective IP (Internet Protocol) addresses. The computer also comprises a power supply 214. Programs are stored in the main memory 240 and executed by the CPU 222.

FIG. 3. Overview

Figure 3:
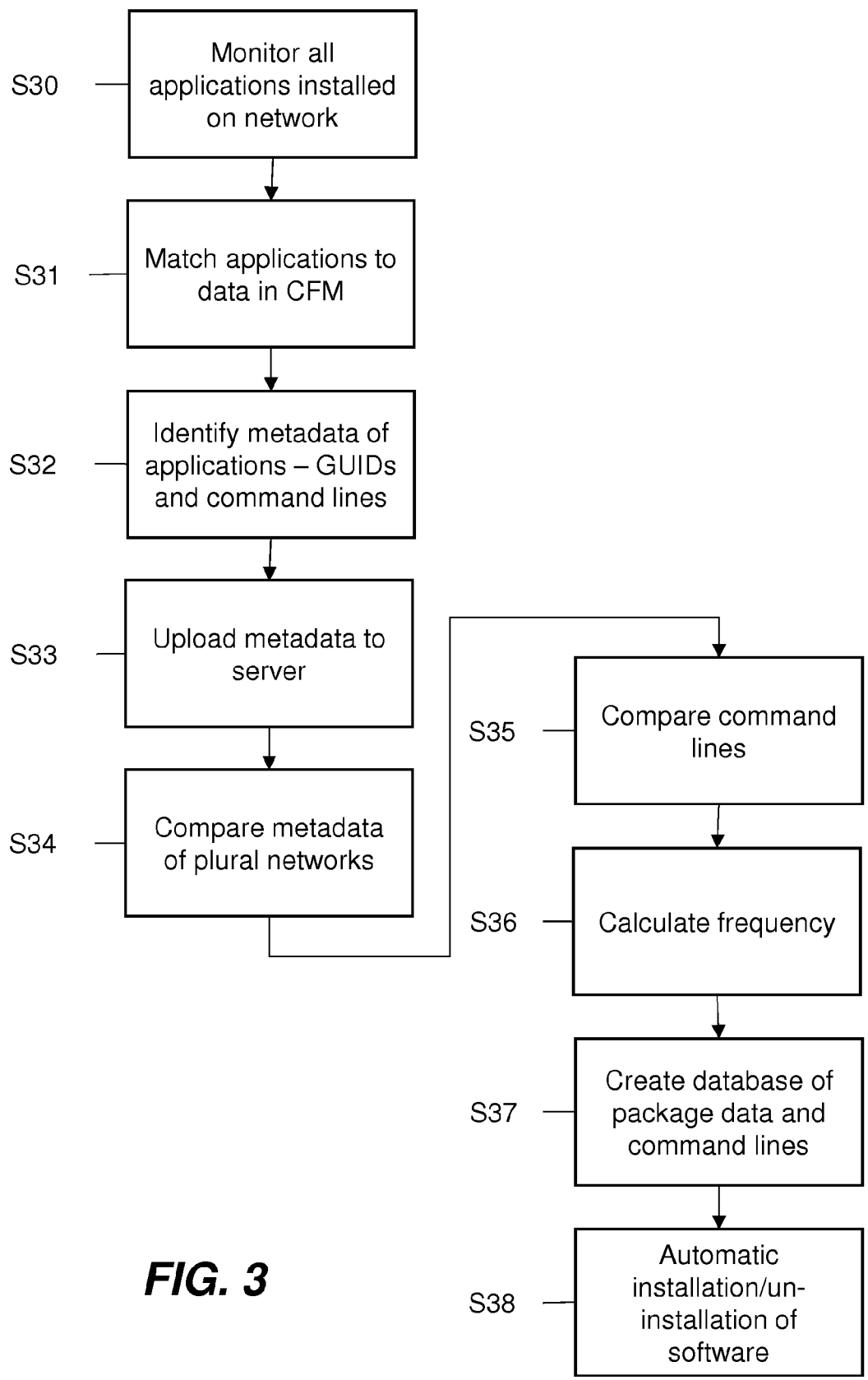
FIG. 3 is a flow chart of an illustrative method of installing and/or un-installing software on plural networks according to one or more embodiments of the present invention.

FIG. 3 is a flow chart of a method of installing and/or un-installing software on plural networks. The method seeks to obtain examples of command lines used to install (or un-install) software on a network and to use those command lines to install (or un-install) software on other networks.

Step S30 is carried out by the CFM 2 and the CFM agents on the computer 10 of the network of FIG. 1. In this example steps S31 and S32 of FIG. 3 are carried out by the local processor 7 in the local network of FIG. 1. Steps S34 to S36 are carried out by the third party server 14 and its database 141. Step S37 is carried out by a computer of for example another network communicating with the database 141 and server 14.

Figure 4:
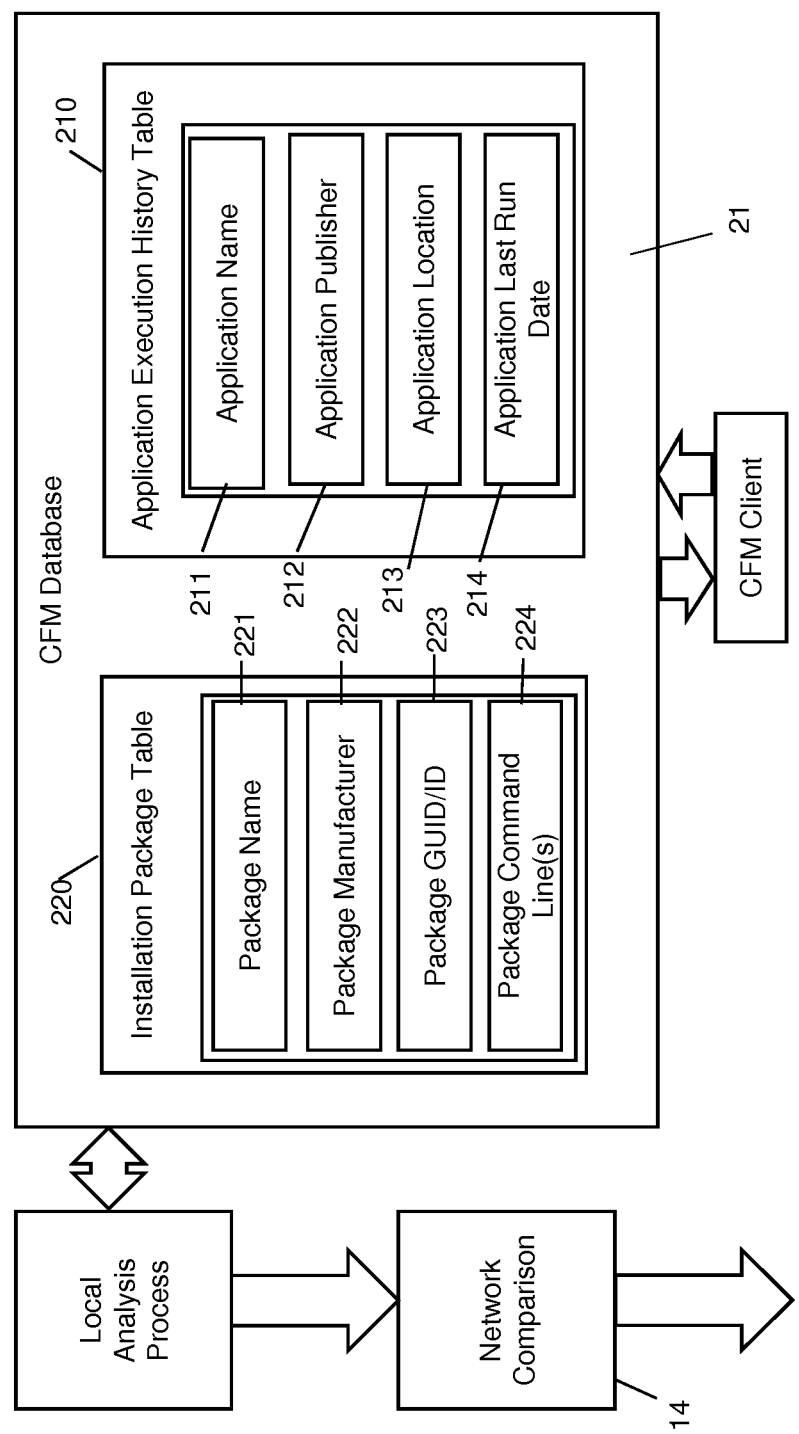
FIG. 4 is a schematic diagram of a data base of a network management system and its relationship with other computers of the network, according to one or more embodiments of the present invention.

Referring to step S30, data relating to all applications installed on the network is monitored and stored in the database 21 of the CFM 2. Referring to FIG. 4, the data base has two data tables; an application history table 210 and an installation package table 220. The history table 210 stores the execution history for different applications that have run on client systems. This process happens automatically and is part of the standard inventory process. The database holds the metadata for each system and its application launch history such as the Name and Version 211, and Publisher 212 which it reads from the binary data of the application. Additionally this contains the location 213 on the client system that the application was run from and the date and time 214 this took place.

The installation package table 220 stores data relating to 'packages' used for installing software on domain systems. Administrative staff create these Packages over time. The database holds metadata for each package such as the Package Name 221, Manufacturer 222, GUID (unique identifier) 223 and command lines 224 for installing or uninstalling the software.

Step S31 compares, for an item of software of interest, the fields of the package table with the fields of the history table and assigns confidence levels (low, medium and high) on the number of matches of fields in the application and fields in all the Packages. If all fields match exactly there is high confidence, if only a couple match there is medium confidence and no matches means low confidence. From this process step S31 correlates the metadata of applications which have been run in the domain with metadata in the package table. Step S32 obtains the metadata from the CFM data. In this example the metadata includes the GUID and the associated installation and/or un-installation command lines. Steps S31 and S32 are repeated for all items of software.

Step S33 sends the metadata to the server 14 and its database 141. The steps S30 to S33 are repeated on plural different organizational networks 18. Thus server 14 contains GUIDs and command lines of software from a plurality of networks.

Steps S34 and S35 compare for a particular item of software, the metadata of plural networks and the command lines of the metadata. Step S36 determines for items of the same software which command lines have the highest frequency of occurrence based on the number of matches found in the comparisons. The metadata having the highest frequency is captured S37 and stored in the database 141. Steps S34 to S37 are repeated for all items of software.

In Step S38, the reverse process takes place and individual networks 18 subscribe to pull down metadata from the database to locally create new packages automatically and without manual Administrator work, because step S34 will have the stored command lines deemed to be of high confidence from the comparisons across other networks 18. These automatically created Packages may be used to update client systems on a network without any manual effort.

Programs

Examples as described herein may be implemented by a suite of computer programs which when run on one or more computer devices of the network. For example, a computer programs run on servers or other computer devices implement the method of FIG. 3. This provides an efficient technical implementation that is easy to reconfigure; however, other implementations may comprise a hardware-only solution or a mixture of hardware devices and computer programs. For example, some computers may have bespoke hardware modules. In one case, different entities may provide different aspects of the examples; for example, the identification process may be implemented by an entity different to that which manages the network and/or provides the systems management tool. Likewise, monitoring of the usage of software on one or more computer devices and/or the gathering of data relating to use of functions is typically performed by one or more computer programs implemented on one or more computer devices that communicate over the network 6 with other computer programs on other computer devices. One or more computer programs that are supplied to implement the invention may be stored on one or more carriers, which may also be non-transitory. Examples of non-transitory carriers include a computer readable medium for example a hard disk, solid state main memory of a computer, an optical disc, a magneto-optical disk, a compact disc, a magnetic tape, electronic memory including Flash memory, ROM, RAM, a RAID or any other suitable computer readable storage device.

The term "software" as used herein refers to any tool, function or program that is implemented by way of computer program code. In use, an executable form of the computer program code is loaded into memory (e.g. RAM) and is processed by one or more processors. As such the term "software" includes, without limitation: an operating system; application programs; patches for, and updates of, software already installed on the network; and new software packages.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of installing and/or un-installing software in a network, the method comprising:
   on each of a plurality of networks, accessing a network management system of the network, the network management system storing metadata comprising at least the identities and command lines of software installed using installation systems of the management systems, and obtaining the metadata for items of software run on the network;
   comparing the metadata of instances of the same software on different networks; and for those instances of the same software having the same metadata on different networks, storing in a database the metadata of the instances of the software;
   using the metadata stored in the database to automatically install or un-install software in at least one of the networks; and
   wherein the network management system of each network has a database storing an application execution history table and an application package table which contains metadata comprising at least the identities and command lines of software installed on the network, and the metadata for items of software run on the network is obtained by running on a computer of the network a program configured to compare fields of the application execution history table with fields of the application package table.

2. The method of claim 1, wherein for a particular software, the metadata having the highest frequency of occurrence based on the comparisons is stored in the database.

3. The method of claim 1, comprising sending the obtained metadata of the plurality of networks to a computer having the database, and carrying out the comparison at the computer.

4. A method of processing software in a network having a network management system having a data base storing an application execution history table and an application package table which stores metadata comprising at least the identities and command lines of software installed on the network, the method comprising:
   running on a computer of the network a program configured to access the network management system of the network, and identifying the metadata for an item of software run on the network by comparing fields of the application execution history table with fields of the application package table
   sending the identified metadata to another computer which stores metadata of software of a plurality of networks, the metadata including for each item of software an identifier of the software and a command line; and
   the another computer calculating confidence levels, a high confidence level being attributed to metadata having the same command lines for a large number of instances of the software on different networks.

5. A non-transitory computer readable medium comprising computer-executable instructions which, when executed by a processor, cause a computing device to perform a method, the method comprising:
   on a computer of a network management system having a data base storing an application execution history table and an application package table which stores metadata comprising at least the identities and command lines of software installed on the network, accessing the network management system of the network;
   identifying the metadata for an item of software run on the network by comparing fields of the application execution history table with fields of the application package table;
   sending the identified metadata to another computer which stores metadata of software of a plurality of networks, the metadata including for each item of software an identifier of the software and a command line; and
   the another computer calculating confidence levels, a high confidence level being attributed to metadata having the same command lines for a large number of instances of the software on different networks.

6. A non-transitory computer readable medium comprising computer-executable instructions which, when executed by a processor, cause a computing device to perform a method, the method comprising:
   on a computer which stores metadata of software of a plurality of networks, the metadata including for each item of software an identifier of the software and a command line, comparing the command lines of items of the same software of different networks;
   creating a database of command lines and identifiers for those items of software having the same command lines on plural instances of the same software; and
   calculating confidence levels, a high confidence level being attributed to metadata of software having the same command lines for a large number of instances of the software on different networks.

* * * * *